Figure 1:
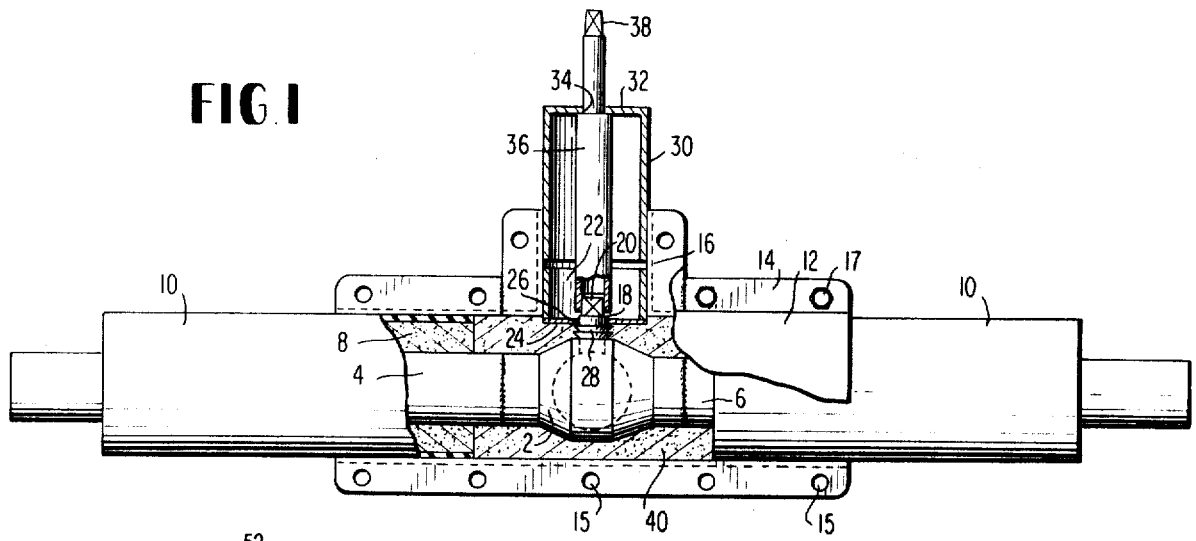

United States Patent [19]

Thastrup

[11] 3,871,400
[45] Mar. 18, 1975

[54] STOP VALVES

[75] Inventor: Ove Thastrup, Fredericia, Denmark

[73] Assignee: A/SE Ramussen, Fredericia, Denmark

[22] Filed: Feb. 22, 1973

[21] Appl. No.: 334,713

Related U.S. Application Data

[63] Continuation-in-part of Ser. No. 223,676, Feb. 4, 1972, which is a continuation of Ser. No. 21,027, March 19, 1970, abandoned.

[30] Foreign Application Priority Data

Feb. 22, 1972  United Kingdom ................ 8120/72

[52] U.S. Cl. ................................ 137/363, 137/375
[51] Int. Cl. ............................................. F16l 59/16
[58] Field of Search ........ 137/375, 363; 285/47, 50, 285/53

[56] References Cited
UNITED STATES PATENTS

| | | | |
|---|---|---|---|
| 334,286 | 1/1886 | Reed | 285/294 |
| 1,108,840 | 8/1914 | Franke | 137/375 |
| 2,176,399 | 10/1939 | Garrett | 137/368 |
| 3,250,297 | 5/1966 | Mooneyham | 137/375 X |
| 3,367,358 | 2/1968 | Rentschler | 137/375 |
| 3,453,716 | 7/1969 | Cook | 138/149 X |
| 3,724,491 | 4/1973 | Knudsen et al. | 137/375 |

FOREIGN PATENTS OR APPLICATIONS

| | | | |
|---|---|---|---|
| 2,012,558 | 9/1970 | Germany | 285/47 |
| 822,456 | 10/1951 | Germany | 285/47 |
| 535,224 | 11/1955 | Italy | 137/375 |

Primary Examiner—Alan Cohan
Assistant Examiner—Gerald A. Michalsky
Attorney, Agent, or Firm—Craig & Antonelli

[57] ABSTRACT

A stop valve unit comprising a valve housing with two connection tube studs and an upwardly projecting valve spindle and adapted to be mounted in a heat insulated pipe system in humid surroundings, such as in subterranean district heating pipe systems, the valve unit being provided with relatively long connection tube studs which are each surrounded by a heat insulating material except for the outermost end portion thereof, said insulating material again being surrounded by a protective tube, these protective tubes having their respective inner ends situated at either side of the spindle, said spindle being surrounded by a spindle tube which adjacent its lower end is closed tightly against the housing of the valve, said inner ends of the protective tubes and lower end of the spindle tube being enclosed within a T-shaped tube casing engaging the respective tube surfaces in a watertight manner. This valve unit may be mounted directly in the ground.

16 Claims, 2 Drawing Figures

PATENTED MAR 18 1975　　3,871,400

STOP VALVES

This application is a continuation-in-part application of my copending application Ser. No. 223,676, filed Feb. 4, 1972, which copending application is a continuation of my earlier application Ser. No. 21,027, filed Mar. 19, 1970, now abandoned.

The present invention relates to a stop valve unit comprising a valve housing with two connection tube studs and an upwardly projecting valve spindle, adapted to be mounted in a heat insulated pipe system in humid surroundings such as in a subterranean district heating pipe system. In such subterranean pipe systems it is common practice to mount the stop valve in concrete wells in which an operator may descend for inspecting or operating the valve.

It is imperative that the heat insulation of the pipe system be kept dry for avoiding both a less effective insulation and corrosion attachs on the conductor pipes. This may be obtained by using pipes having an outer protective tube of plastics surrounding the insulation. Adjacent the stop valves, however, the protective tube should necessarily be broken for allowing the spindle to pass out, and it has proved very difficult to provide an absolutely tight connection between the spindle and a passage hole in the protective tube. For this reason it has been preferred to mount the valves in the said wells whereby both the valves and the ends of the isultation around the pipes connected to the valve will be situated in relaltively dry surroundings, since the wells may be drained so that only the air humidity acts on the said elements. However, the wells are expensive in construction, and despite the use thereof it should be checked regularly that the valves and the adjoining pipes and their insulation are in order. Therefore, when inspections are necessary anyway, there is often used a cheap cock type valve which requires lubrication from time to time, and already in a district heating system in a middle sized city of about 20,000 inhabitants there are so many valves of this kind that it is a full time job for a man to inspect and lubricate the valves. Valves requiring no lubrication are known, but normally they are more expensive.

It is the object of this invention to provide a stop valve unit which is mountable directly in wet surroundings whereby both the said wells and the said inspection work can be avoided.

According to the invention the stop valve is provided with relatively long connection tube studs which are each surrounded by a heat insulating material except for the outermost end portion thereof, said insulating material again being surrounded by a protective tube, these protective tubes having their respective inner ends situated at either side of the spindle, said spindle being surrounded by a spindle tube which adjacent its lower end is closed tightly against the housing of the valve, said inner ends of the protective tubes and lower end of the spindle tube being enclosed within a T-shaped tube casing engaging the respective tube surfaces in a watertight manner.

In this manner there is provided a stop valve having the free end of its connection tubes shaped like the ends of the ordinary insulated pipe lengths of which the pipe system is normally made, these lengths each having a central iron conductor pipe the ends of which project from the surrounding insulation and protection material, whereby two consecutive pipe lengths can be joined by welding together the ends of the iron pipes and thereafter bridging the space around this joint by means of a tube casing tightly connected to the end portions of the adjacent ends of the protective tubes of the two lengths; a pipe system of this type, by way of example, is described in our patent application Ser. No. 2,027. The stop valve according to the invention, therefore, may be mounted in the pipe system just as any other pipe length, i.e. there are no special sealing problems as far as the ends of the pipe lengths are concerned. The valve housing portion around the spindle will be sealingly connected with the protective tubes by virtue of the said tube casing, so also at this place complete tightness will be sured. The stop valve unit according to the invention, therefore, may be mounted directly in the ground and though, of course, the stop valve itself should be of a type requiring no lubrication, this arrangement will be relatively cheap, since the said well may be entirely avoided.

Figure 2:
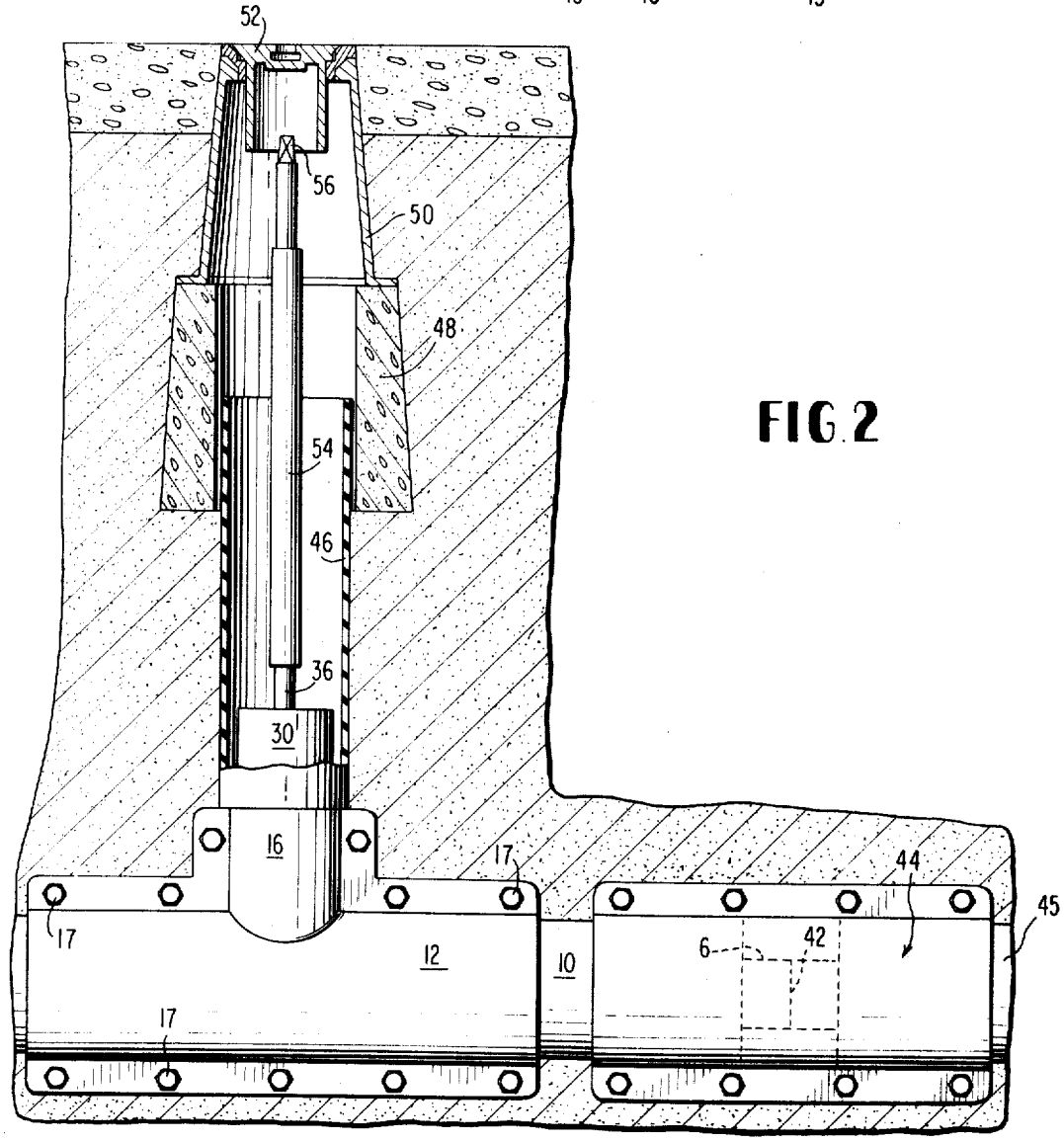

The invention is described in more detail in the following by way of example with reference to the accompanying drawing, in which:

FIG. 1 is a sectional view of a valve unit according to a preferred embodiment of the invention, and FIG. 2 is a side elevation, partly in section, illustrating a manner of arranging the spindle tube in the ground.

The valve unit shown in FIG. 1 comprises a stop valve 2 having it inlet and outlet welded to pipes 4 and 6, respectively, these pipes being of the type insulated with a cylindrical layer of a suitable insulating material 8 which is surrounded by a protective outer tube 10 e.g. of hard plastics. At the outer ends of these insulated pipes the interior conductor pipes 4 and 6 project beyond the ends of the outer components 8 and 10 so as to be joinable to the correspondingly shaped end of ordinary insulated pipe lengths in a pipe system. The valve 2 and the inner ends of the protective tubes 10 are surrounded by a casing 12 consisting of two half cylindrical shell members having longitudinal flanges 14 by means of which they are tightened very firmly around the ends of the tubes 10 so as to bridge the space between the ends of these tubes, the shell flanges having holes 15 for receiving tightening bolts 17 (FIG. 2) according to the joining system disclosed in our said copending patent application.

The casing shells are provided with a half cylindrical branch portion 16 defining a tube portion branched off from the straight, through-going portion of the casing 12. This branch portion is located adjacent the top of the valve 2, where a neck portion 18 projects upwardly from the valve housing, serving as a guiding bushing for the valve spindle 20.

In the lower end of the casing branch 16 there is mounted a short tube member 22 having a bottom plate 24 in which there is provided a hole 26, through which the valve spindle 20 projects. As shown, even the spindle neck 18 may project through the hole 26. Underneath the bottom portion 24, around the spindle neck there is mounted a sealing ring 28 which is axially compressed between the underside of the bottom 24 and the top side of the housing of the valve 2 so as to provide an annular seal therebetween; the bowl member 22,24 is rigidly clamped inside the casing branch 16 so as to be able to maintain a sealing pressure on the sealing ring 28, the position of the valve 2 being fixed by means of the hard insulating material 8, e.g. consisting of polyurethane foam, or by means of rigid spacer elements (not shown) between the pipes 4 and 6 and their respective protective tubes 10 or even between the valve 2 and the interior side of the casing 12. Also tightly received in the casing branch 16 there is mounted a tube member 30 projecting upwardly therefrom and having at its top an end plate 32 provided with a hole 34 serving to laterally supported a rod key 36 which at its lower end engages a square head on the top of the spindle 20 and has a square head 38 at its own top.

The space around the valve 2 inside the casing 12 and under the bottom portion 24 is filled with an insulating material 40 which is preferably introduced through a hole (not shown) in the casing, whereafter this hole is closed in a watertight manner, e.g. as disclosed in our copending patent application Ser. No. 301,065. It will be appreciated that when care is taken to effectively seal the casing shells against the tubes 10 and against the cylindrical portions of the members 22 and 30 as well as against each other along the flanges 14 thereof, no water or moisture can intrude into the space around the valve, whereby corrosion attacks are prevented. Nevertheless, the valve is easily operated by means of the key 36.

The valve assembly may be mounted in the ground as shown in FIG. 2. The aligned tubes 4 and 6 are joined to the ends of the adjoining pipe lengths 45 as disclosed in our said application Ser. No. 21,027, i.e. at each joint by welding together the ends of the conductor tubes as shown at 42 and tightening a tube casing 44 around the adjacent ends of the outer protective tubes 10. The casing branch portion 16 is oriented upwardly and a vertical tube 46 is placed with its lower end surrounding the projecting part of the inverted bowl member 30 and rested against the top edge of the casing branch portion 16. The tube 46 extends up through the ground into the interior of a hollow concrete block 48 above which there is mounted a carrier cone 50 for a removable cover member 52. Axially through the described parts there extends a long key member 54 which engages the square head 38 of the short key 36 and has an upper square head 56 to be engaged by a usual key upon removal of the cover 52, when it is desired to close or open the valve 2.

It will be appreciated that the stop valve unit can be assembled under factory conditions and used as a unit as shown in FIG. 1. The invention is, of course, not limited to the embodiment shown. Instead of the use of the sealing ring 28 the bottom plate 24 may be welded directly to the spindle neck 18 around the hole 26, or a radially compressed sealing ring may be provided between the edge of the hole 26 and the outside of the spindle neck 18. Also the tube casing may be of any suitable construction when it fulfills the purpose of tightly enclosing the tubes 10 and the spindle surrounding tube 22,30.

What is claimed is:

1. A stop valve unit comprising a valve housing with two connection tube studs and an upwardly projecting valve spindle and adapted to be mounted in a heat insulated pipe system in humid surroundings, such as in subterranean district heating pipe system, characterized in that the valve is provided with relatively long connection tube studs which are each surrounded by a heat insulating material except for the outermost end portion thereof, said insulating material again being surrounded by protective tubes these protective tubes having their respective inner ends situated at either side of the spindle, said spindle being surrounded by a spindle tube which adjacent its lower end is closed tightly against the housing of the valve, said inner ends of the protective tubes and lower end of the spindle tube being enclosed within a T-shaped tube casing engaging the respective tube surfaces in a watertight manner, and characterized in that the spindle tube adjacent its lower end is provided with a bowl bottom having a hole for receiving a portion of the spindle projecting from the valve housing, and that sealing means are provided around said portion of the spindle between the underside of the bowl bottom of the spindle tube and the top side of the valve housing.

2. A stop valve unit according to claim 1, characterised in that the T-shaped tube casing is of the type consisting of two T-shaped half cylindrical shells which are tightened together about the respective tube ends.

3. A stop valve unit according to claim 1, characterized in that the spindle tube is made of a lower tube piece provided with said bowl bottom and having said hole for receiving the spindle, the bowl bottom being tightly connected with the valve housing around this hole, and an upper tube piece at the top of which there is provided radially inwardly directed means for laterally supporting the spindle, the two tube pieces being joined in axial alignment by having their adjacent ends tightly enclosed within the T-branch of the tube casing.

4. A stop valve unit according to claim 3, wherein said inwardly directed means is an end plate portion having a passage hole for the spindle.

5. A stop valve unit comprising a valve housing with two connection tube studs and an upwardly projecting valve spindle and adapted to be mounted in a heat insulated pipe system in humid surroundings, such as in subterranean district heating pipe systems, characterized in that the valve is provided with relatively long connection tube studs which are each surrounded by a heat insulating material except for the outermost end portion thereof, said insulating material again being surrounded by protective tubes, these protective tubes having their respective inner ends situated at either side of the spindle, said spindle being surrounded by a spindle tube which adjacent its lower end is closed tightly against the housing of the valve, said inner ends of the protective tubes and lower end of the spindle tube being closed within a T-shaped tube casing engaging the respective tube surfaces in a watertight manner, and characterized in that the spindle tube is made of a lower tube piece shaped as a bowl in the bottom of which there is a passage hole for the spindle, the bowl bottom being tightly connected with the valve housing around this hole, and an upper tub piece at the top of which there is provided radially inwardly directed means for laterally supporting the spindle, the two tube pieces being joined in an axial alignment by having their adjacent ends tightly enclosed within the T-branch of the said tube casing.

6. A stop valve unit according to claim 5, wherein said inwardly directed means is an end plate portion having a passage hole for the spindle.

7. A stop valve unit for use with a heat insulated pipe system; said stop valve unit comprising:

valve housing means for enclosing movable valve means, valve spindle means operatively connectible to said valving means and projecting outwardly from said valve housing means, an inlet connection tube stud sealingly connected to said valve housing means for accommodating flow of fluid into said valve housing means, an outlet connection tube stud sealingly connected to said valve housing means for accommodating flow of fluid out of said valve housing means, said inlet and outlet tube studs being connected to said valve housing means at positions spaced from one another and from said spindle means, axially extending protective tube means circumferentially surrounding each of said tubes studs at a spacing from the outside surfaces of said studs, said protective tube means having respective inner axial ends spaced from said valve spindle means and valve housing means, heat insulating material filling the space between said protective tube means and tube studs, each of said tube studs having an outer axial end portion which extends outwardly away from said housing means beyond the respective outer axial end portions of the respective surrounding protective tube means and heat insulating material for accommodating connection of said outer end portions of said tube studs to correspondingly shaped end portions of fluid conducting tubes of a pipe system, spindle tube means surrounding said valve spindle means along at least a portion of the axial length of said valve spindle means, said spindle tube means having one end portion closed tightly against said valve housing means, and tube casing means surrounding said valve housing means and enclosing the inner ends of said protective tube means and at least the portion of said spindle tube means adjacent said valve housing means, said tube casing means being in fluid tight engagement with the outer surfaces of each of said protective tube means and spindle tube means such that a fluid sealed stop valve unit is formed which has an outwardly projecting valve spindle means and outwardly projecting heat insulated tube studs which have outer end portions configured for attachment in a pipe system, whereby the stop valve unit can be readily installed as a complete unit in a pipe system by simply connecting said outer end portions of said tube studs to tubes of the system, wherein said spindle tube means includings: a tube piece having a bowl shaped bottom portion provide with a hole for receiving the spindle means, and a sealing ring interposed and axially compressed between a side of the valve housing means and the side of said bowl shaped bottom portion which faces said valve housing means.

8. A unit according to claim 7, wherein said tube casing means is spaced from the outer surfaces of said valve housing means, further comprising heat insulating material filling the space between said tube casing means and said valve housing means.

9. A unit according to claim 8, wherein said valve housing means is spaced from a portion of said spindle tube means which in facing relationship to the valve housing means, further comprising heat insulating material filling the space between said portion of said spindle tube means and said valve housing means.

10. A unit according to claim 9, wherein said tube casing means is formed of a plurality of shells connected to one another.

11. A unit according to claim 9, wherein said inlet and outlet tube studs are axially aligned with one another and are connected at opposite sides of said valve housing means, wherein said valve spindle means extends out of said valve housing means in a direction perpendicular to the axial extent of said studs, and wherein said tube casing means includes two T-shaped half cylindrical shells connected to one another in clamping engagement over the respective protective tube means and spindle tube means.

12. A unit according to claim 7, wherein said inlet and outlet tube studs are axially aligned with one another and are connected at opposite sides of said valve housing means, wherein said valve-spindle means extends out of said valve housing means in a direction perpendicular to the axial extent of said studs, and wherein said tube casing means includes two T-shaped half cylindrical shells connected to one another in clamping engagement over the respective protective tube means and spindle tube means.

13. A unit according to claim 7, further comprising: a vertical tube in surrounding relation to said spindle tube means which has a lower end in abutting engagement with the upper ends of said shells when said unit is arranged with said tube studs extending horizontally and said spindle means extending vertically, a hollow concrete block in surrounding relationship to the upper portion of said vertical tube, said concrete block being supported at downwardly facing edges thereof by soil with said unit in an in-use position disposed underneath the ground surface, and a carrier cone with removable cover member supported on top of said concrete block, said carrier cone, concrete block, and vertical tube all including central openings for accommodating access to said spindle means by key means.

14. A stop valve unit for use with a heat insulated pipe system; said stop valve unit comprising:

valve housing means for enclosing movable valving means, valve spindle means operatively connectible to said valving means and projecting outwardly from said valve housing means, an inlet connection tube stud sealingly connected to said valve housing means for accommodating flow a fluid into said valve housing means, an outlet connection tube stud sealingly connected to said valve housing means for accommodating flow of fluid out of said valve housing means, said inlet and outlet tube studs being connected to said valve housing means at positions spaced from one another and from said valve spindle means, axially extending protective tube means circumferentially surrounding each of said tube studs at a spacing from the outside surfaces of said tube studs, said protective tube means having respective inner axial ends spaced from said valve spindle means and valve housing means, heat insulating material filling the space between said protective tube means and tube studs, each of said tube studs having an outer axial end portion which extends outwardly from said housing means beyond the respective outer axial end portions of the respective surrounding protective tube means and heat insulating material for accommodating connection of said outer end portions of said tube studs to correspondingly shaped end portions of fluid conducting tubes of a pipe systems, spindle tube means surrounding said valve spindle means along at least a portion of the axial length of said valve spindle means, said spindle tube means having one end portion closed tightly against said valve housing means, and tube casing means surrounding said valve housing means and enclosing the inner ends of said protective tube means and at least the portion of said spindle tube means adjacent said valve housing means, said tube casing means being in fluid tight engagement with the outer surfaces of each of said protective tube means and spindle tube means such that a fluid sealed stop valve unit is formed which has an outwardly projecting valve spindle means and outwardly projecting heat insulated tube studs which have outer end portions configured for attachment in a pipe system, whereby the stop valve unit can be readily installed as a complete unit in a pipe system by simply connecting said outer end portions of said tube studs to tubes of the system, wherein said tube means includes a further tube piece arranged outwardly of the above-mentioned tube piece with respect to said valve housing means, said further tube piece including inwardly projecting means for laterally supporting the spindle means, said tube pieces being unthreaded and being connected to one another by said tube casing means.

15. A unit according to claim 7, wherein said inlet and outlet tube studs are axially aligned with one another and are connected at opposite sides of said valve housing means, wherein said valve spindle means extends out of said valve housing means in a direction perpendicular to the axial extent of said studs, and wherein said tube casing means includes two T-shaped half cylindrical shells connected to one another in clamping engagement over the respective protective tube means and spindle tube means.

16. A unit according to claim 14, wherein said spindle tube means includes: a tube piece having a bowl shaped bottom portion provided with a hole for receiving the spindle means, and a sealing ring interposed and axially compressed between a side of the valve housing means and the side of said bowl shaped bottom portion which faces said valve housing means.

* * * * *